(12) United States Patent
Liu

(10) Patent No.: US 10,573,212 B2
(45) Date of Patent: Feb. 25, 2020

(54) DISPLAY DEVICE AND METHOD FOR DRIVING DISPLAY DEVICE

(71) Applicant: BOE TECHNOLOGY GROUP CO., LTD., Beijing (CN)

(72) Inventor: Jiayao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 63 days.

(21) Appl. No.: 15/933,084

(22) Filed: Mar. 22, 2018

(65) Prior Publication Data
US 2019/0139472 A1  May 9, 2019

(30) Foreign Application Priority Data

Nov. 8, 2017   (CN) .......................... 2017 1 1090440

(51) Int. Cl.
| | |
|---|---|
| *G09G 3/00* | (2006.01) |
| *G02B 27/22* | (2018.01) |
| *G02B 26/08* | (2006.01) |
| *G02B 26/00* | (2006.01) |
| *G02F 1/29* | (2006.01) |

(52) U.S. Cl.
CPC .......... *G09G 3/007* (2013.01); *G02B 26/004* (2013.01); *G02B 26/0875* (2013.01); *G02B 27/2214* (2013.01); *G02F 1/29* (2013.01); *G09G 3/001* (2013.01); *G09G 3/003* (2013.01); *G02F 2001/294* (2013.01); *G09G 2320/028* (2013.01); *G09G 2320/068* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2017/0264891 | A1 | 9/2017 | Iwasaki |
| 2018/0150028 | A1 | 5/2018 | Liu et al. |
| 2019/0035364 | A1* | 1/2019 | Iwasaki .................. G02B 27/22 |

FOREIGN PATENT DOCUMENTS

| | | |
|---|---|---|
| CN | 102004323 A | 4/2011 |
| CN | 103186008 A | 7/2013 |
| CN | 106501952 A | 3/2017 |
| CN | 106605172 A | 4/2017 |
| WO | 2017145590 A1 | 8/2017 |

OTHER PUBLICATIONS

First Chinese Office Action dated Aug. 26, 2019, received for corresponding Chinese Application No. 201711090440.0.

* cited by examiner

*Primary Examiner* — Duane N Taylor, Jr.
(74) *Attorney, Agent, or Firm* — Kinney & Lange, P.A.

(57) ABSTRACT

A display device and a method for driving the display device are disclosed. The display device includes: a display array layer including a plurality of display pixel sets, each of the plurality of display pixel sets including at least one display pixel; and a lens array layer arranged at a light exit side of the display array layer and including a plurality of lens groups arranged in array, each of the plurality of lens groups including at least one varifocal lens. Each of the plurality of lens groups is configured to vary a focal length of the at least one varifocal lens such that at least one of the plurality of display pixel sets form different viewpoints at different display phases respectively in response to variation of the focal length.

19 Claims, 11 Drawing Sheets

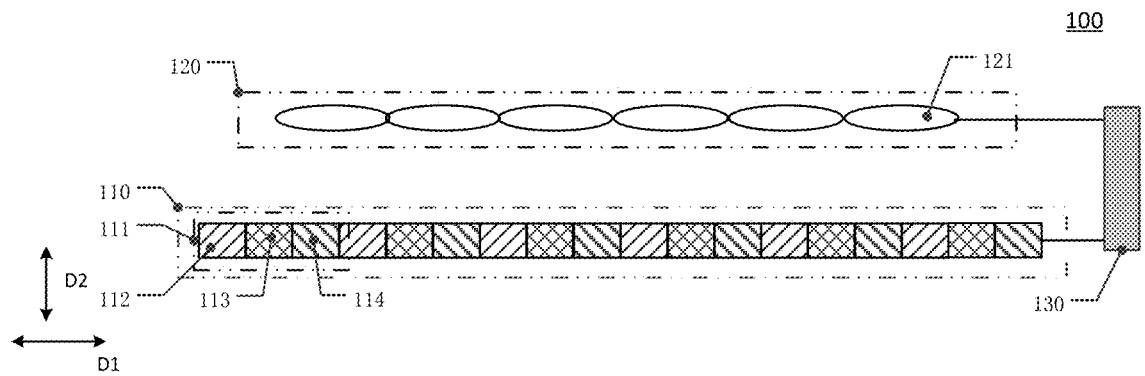
Fig.2B
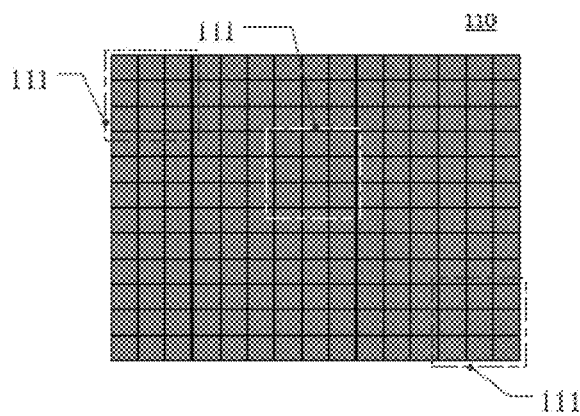
Fig.2C
| | 111 | |
|---|---|---|
| 112 | 113 | 114 |
| 1121 | 1131 | 1141 |
| 1122 | 1132 | 1142 |
Fig.2D

DISPLAY DEVICE AND METHOD FOR DRIVING DISPLAY DEVICE

CROSS-REFERENCE TO RELATED APPLICATION

This application claims benefit of the Chinese Patent Application No. 201711090440.0, filed with the State Intellectual Property Office of China on Nov. 8, 2017, which is incorporated herein by reference in its entirety.

BACKGROUND OF THE DISCLOSURE

Field of the Disclosure

Embodiments of the present disclosure relate to a display device and a method for driving the display device.

Description of the Related Art

In recent years, three-dimensional (3D) display has become very popular in the display field. The principle of a 3D display device is: the left eye and the right eye of a person receive different images with parallax (for example, a first image and a second image with parallax) respectively, then the brain may create stereoscopic vision (for example, distance feeling, depth feeling and stereoscopic feeling) on a basis of the first image viewed by the left eye (the left eye image) and the second image viewed by the right eye (the right eye image).

SUMMARY OF DISCLOSURE

An embodiment of the present disclosure provides a display device, including: a display array layer comprising a plurality of display pixel sets, each of the plurality of display pixel sets comprising at least one display pixel; and a lens array layer arranged at a light exit side of the display array layer and comprising a plurality of lens groups arranged in array, each of the plurality of lens groups comprising at least one varifocal lens; wherein each of the plurality of lens groups is configured to vary a focal length of the at least one varifocal lens such that at least one of the plurality of display pixel sets form different viewpoints at different display phases respectively in response to variation of the focal length.

In some embodiments, each of the plurality of lens groups comprises one varifocal lens and each of the plurality of display pixel sets comprises at least two display pixels, the one varifocal lens corresponding to at least two display pixels of one of the plurality of display pixel sets; and wherein each of the display pixels form different viewpoints at different display phases respectively in response to variation of the focal length of the corresponding varifocal lens.

In some embodiments, each of the display pixels of the display pixel sets has a display state which varies in response to variation of the focal length of the corresponding varifocal lens.

In some embodiments, different display pixels in a same display pixel set correspond to different viewpoints respectively.

In some embodiments, the display device further comprises a controller, wherein the controller is configured such that at a same display phase a plurality of the varifocal lenses have a same focal length and the focal length of each of the varifocal lens varies as the display phase changes; and wherein the controller is further configured such that refresh frequency of the display array layer is not less than refresh frequency of the lens array layer.

In some embodiments, the controller is further configured such that variation of the focal length of the lens is synchronous with variation of display images of the display array layer.

In some embodiments, a distance between the display array layer and the lens array layer in a direction perpendicular to the display array layer is equal to an average value of focal lengths of all of the varifocal lenses in time domain.

In some embodiments, the plurality of lens groups are in one-to-one correspondence with the plurality of display pixel sets.

In some embodiments, all of the display pixel sets have a same number of the display pixels.

In some embodiments, the display array layer further comprises a plurality of spacing pixel sets, and each of the plurality of spacing pixel sets is arranged between adjacent display pixel sets and comprises at least one spacing pixel.

In some embodiments, the varifocal lens is a liquid crystal lens or a liquid lens.

In some embodiments, the lens groups are fully composed of varifocal lenses.

An embodiment of the present disclosure provides a method for driving the display device as claimed in claim 1, wherein each display cycle sequentially comprises a first display phase and a second display phase, the method comprising: in the first display phase, controlling the focal lengths of the varifocal lenses in the plurality of lens groups of the lens array layer to drive the display array layer to display a first group of viewpoint images; and in the second display phase, controlling the focal lengths of the varifocal lenses in the plurality of lens groups of the lens array layer to drive the plurality of display pixel sets in the display array layer to display a second group of viewpoint images; wherein each of the varifocal lenses has a focal length in the first display phase that is different from that in the second display phase.

In some embodiments, in the display device, each of the plurality of lens groups comprises one varifocal lens and each of the plurality of display pixel sets comprises at least two display pixels, the one varifocal lens corresponding to at least two display pixels; and wherein the method comprises: in the first display phase, driving the display array layer to display the first group of viewpoint images and driving the lens array layer such that the focal lengths of a plurality of varifocal lenses are all equal to a first focal length; and in the second display phase, driving the plurality of display pixel sets of the display array layer to display the second group of viewpoint images and driving the lens array layer such that the focal lengths of the plurality of varifocal lenses are all equal to a second focal length; wherein the first focal length is unequal to the second focal length.

In some embodiments, each display cycle further comprises a third display phase following the second display phase, the method further comprising: in the third display phase, controlling the focal lengths of the varifocal lenses in the plurality of lens groups of the lens array layer and driving the plurality of display pixel sets in the display array layer to display a third group of viewpoint images; wherein each of the varifocal lenses has a focal length in the third display phase that is different from any one of that in the first display phase and that in the second display phase.

In some embodiments, each display cycle further comprises a third display phase following the second display phase, the method further comprising: in the third display phase, driving the display array layer to display a third group of viewpoint images and driving the lens array layer such that the focal lengths of a plurality of lenses are all equal to a third focal length; wherein the third focal length is neither equal to the first focal length, nor equal to the second focal length.

In some embodiments, refresh frequency of the display array layer is not less than refresh frequency of the lens array layer.

In some embodiments, number of viewpoint images comprised in the first group of viewpoint images and number of viewpoint images comprised in the second group of viewpoint images are both equal to number of the display pixels in each of the display pixel sets.

In some embodiments, in the first display phase, the display pixels located at same or corresponding positions in all of the display pixel sets are driven to display image pixels corresponding to one same viewpoint image.

In some embodiments, the display array layer further comprises a plurality of spacing pixel sets and each of the plurality of spacing pixel sets is arranged between adjacent display pixel sets and comprises at least one spacing pixel; and the method further comprises: in the first display phase and the second display phase, keeping the plurality of spacing pixel sets in the display array layer to be non-luminous.

BRIEF DESCRIPTION OF THE DRAWINGS

In order to explain the technical solutions of embodiments of the present disclosure more explicitly, figures required for describing the embodiments will below be described briefly. Apparently, the following figures are only intended to show some of embodiments of the present disclosure, instead of limiting the present disclosure.

FIG. 2B is a schematic cross-sectional view of the display device shown in FIG. 2A;

FIG. 2C is a schematic plan view showing a display array layer of the display device shown in FIG. 2A;

FIG. 2D is a schematic plan view showing display pixel sets of the display array layer shown in FIG. 2C;

DETAILED DESCRIPTION OF PREFERRED EMBODIMENTS OF THE DISCLOSURE

In order that the objects, technical solutions and advantages of embodiments of the present disclosure can become more apparent, technical solutions in the embodiments of the present disclosure will below be explained clearly and entirely with reference to drawings for the embodiments of the present disclosure. Apparently, the described embodiments are only some of embodiments in the present disclosure, instead of all of embodiments. From the described embodiments of the present disclosure, all of other embodiments derived by the skilled person in the art without any creative efforts fall within the scope of the present disclosure.

Unless defined otherwise, the technical terms or scientific terms used in the present disclosure should be understood as the general signification that can be understood by the skilled person in the art. The phrases of "first", "second" and the like used in the present disclosure do not represent any orders, numbers or significances, but only used to distinguish different composite parts. As such, terms of such as "one", "a", "the" or the like are also not intended to limit number, but represent there are at least one. Phrases of such as "comprise" or "contain" are intended to represent the elements or objects before the phrases can cover the listed elements or objects and the equivalents thereof behind the phrases, without excluding other elements or objects. Phrases such as "connection", "connected" or the like are not intended to define physical or mechanical connection, but may include electrical connection, whether it is direct or indirect. The terms of "upper", "lower", "left", "right" and the like are only intended to represent relative position relationship. When the absolute positions of the described objects have been changed, the relative position relationship may also be changed correspondingly.

Figure 1A:
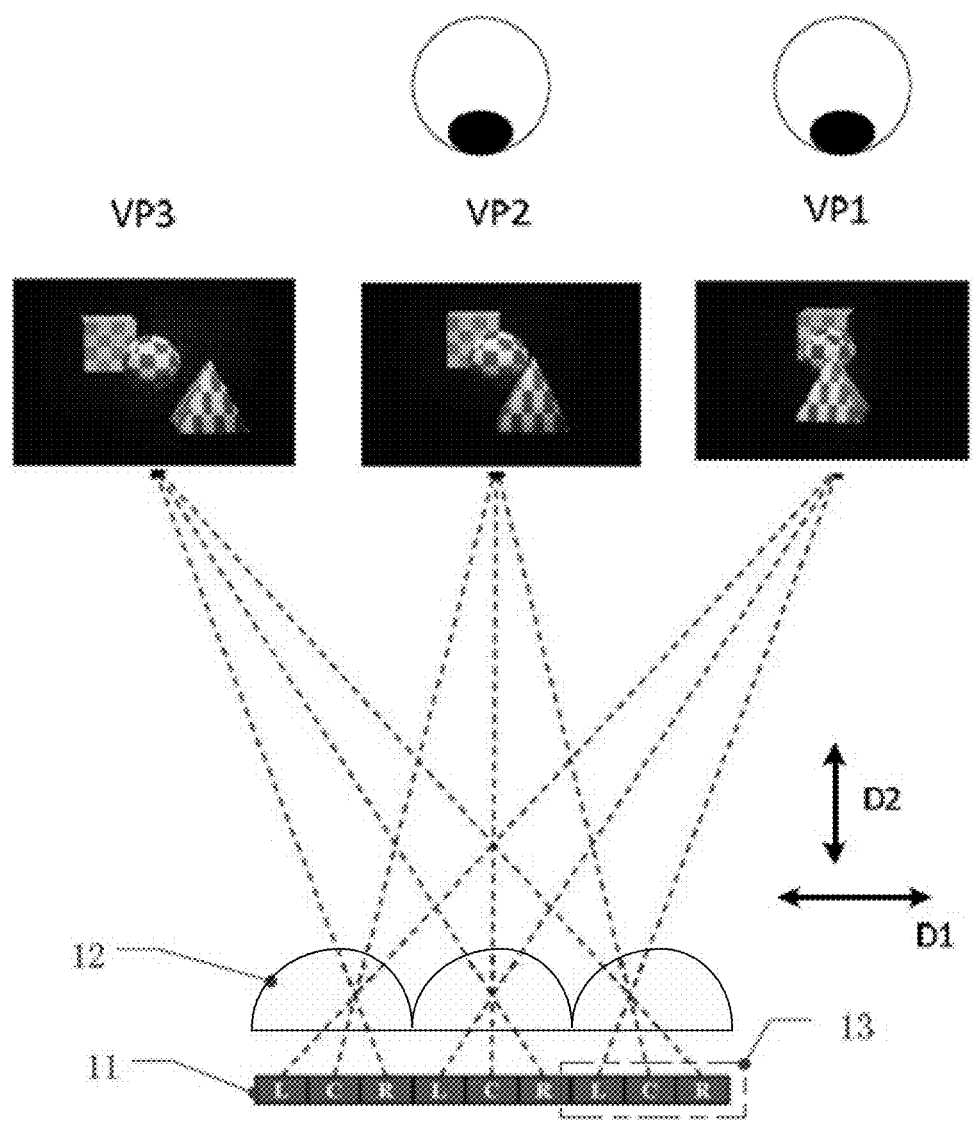
FIG. 1A is a schematic cross-sectional view showing a three-dimensional display device.
Figure 1B:
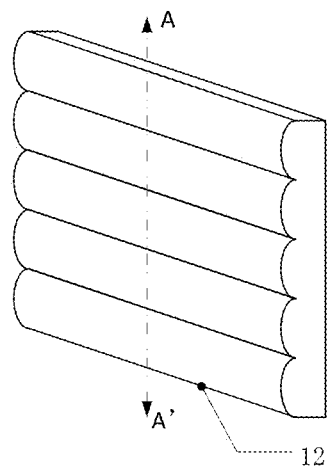
FIG. 1B is a schematic view showing a column lens array.

FIG. 1A shows a schematic cross-sectional view of a three-dimensional display device. The three-dimensional display device includes a two-dimensional display panel 11 and a column lens array 12. For example, the schematic cross-sectional view of the column lens array 12 shown in FIG. 1A, is taken along the line A-A' shown in FIG. 1B. For example, as shown in FIG. 1A and FIG. 1B, the column lens array 12 includes a plurality of column lenses arranged in a first direction D1. For example, as shown in FIG. 1A, the two-dimensional display panel 11 may include a plurality of display pixel sets 13 arranged in the first direction D1. Each of the plurality of display pixel sets may include a first display pixel L, a second display pixel C and a third display pixel R arranged sequentially along the first direction D1. For example, as shown in FIG. 1A, the column lenses are in one-to-one correspondence with the display pixel sets 13, that is, each of the column lenses corresponds to one first display pixel L, one second display pixel C and one third display pixel R.

For example, as shown in FIG. 1A, the first display pixel L is configured to form a first viewpoint (first viewpoint image); the second display pixel C is configured to form a second viewpoint (second viewpoint image); and the third display pixel R is configured to form a third viewpoint (third viewpoint image). That is, the display device shown in FIG. 1A may be a three viewpoint type three-dimensional display device. For example, the first viewpoint image, the second viewpoint image and the third viewpoint image are two-dimensional images configured to form the three-dimensional display and there is parallax information among the first viewpoint image, the second viewpoint image and the third viewpoint image. It should be noted that for the sake of clarity, FIG. 1A exaggerates the difference among the first viewpoint image, the second viewpoint image and the third viewpoint image.

For example, when the eyes observe the first viewpoint image and the second viewpoint image, the brain may combine them into one three-dimensional image (first stereoscopic image); again, for example, when the eyes observe the second viewpoint image and the third viewpoint image, the brain may combine them into another three-dimensional image (second stereoscopic image). The second stereoscopic image is slightly different from the first stereoscopic image. Thus, in comparison with two viewpoint type three-dimensional display device (that is, only can display two viewpoint images). The three-dimensional display device shown in FIG. 1A not only may allow the user to move in a certain range when viewing three-dimensional images/videos, but also may allow the user to see different three-dimensional images at different positions. That is, the three-dimensional display device shown in FIG. 1A not only may enhance the freedom of the user for using the three-dimensional display device, but also may improve the three-dimensional effects of the display image.

In research, the inventors of the present disclosure recognized that the three-dimensional display device as shown in FIG. 1A has a resolution N3 in a first direction D1 which is ratio of the resolution N2 of the two-dimensional display panel 11 in the first direction D1 to number Np of the display pixels included in the display pixel set 13 in the first direction D1, i.e., N3=N2/Np. For example, as shown in FIG. 1A, in case that each display pixel set 13 includes three display pixels in the first direction D1, the three-dimensional display device has the resolution in the first direction D1 which is ⅓ of the resolution of the two-dimensional display panel 11 in the first direction D1.

For example, in order to increase the number of viewpoint images shown in the three-dimensional display device (that is, number of viewpoints of the three-dimensional display device) and further enhance the freedom of the user using the three-dimensional display device and three-dimensional effects of the displayed image, it is possible to increase the number of the display pixels included in each display pixel set 13 in the first direction D1. However, it will further reduce the resolution of the three-dimensional display device. For example, in case that the number of the display pixels included in each display pixel set 13 in the first direction D1 is increased to 6, the three-dimensional display device has the resolution in the first direction D1 which is ⅙ of the resolution of the two-dimensional display panel 511 in the first direction D1.

In research, the inventors of the present application also have recognized that, for the three-dimensional display device as shown in FIG. 1A, when the user moves in a direction (i.e., a third direction) perpendicular to the first direction D1 and the second direction D2 (for example, the relative position between the eyes of the user and the three-dimensional display device changes in the third direction), the viewpoint images seen by the user will not change. Thus, the three-dimensional image sensed by the user will also not change, thereby reducing the three-dimensional display effect and user's experiences.

Embodiments of the present disclosure provide a display device and a method for driving the display device. The display device and the method for driving the display device may increase number of the viewpoints in the display device without reducing the resolution.

The display device and the method for driving the display device provided by the embodiments of the present disclosure will be described in details from several embodiments below.

An embodiment of the present disclosure provides a display device including a display array layer and a lens array layer. The display array layer includes a plurality of display pixel sets, each of the plurality of display pixel sets including at least one display pixel. The lens array layer is arranged at a light exit side of the display array layer and includes a plurality of lens groups arranged in array, each of the plurality of lens groups including at least one varifocal lens. Each of the plurality of lens groups corresponds to at least one display pixel set. Each of the plurality of lens groups is configured to vary focal length of the at least one varifocal lens such that at least one of the plurality of display pixel sets form different viewpoints at different display phases respectively in response to variation of the focal length.

On a basis of the display device provided, in different display phases of the display cycle, for example, each display cycle sequentially includes a first display phase and a second display phase. In the first display phase, focal length of varifocal lens in the plurality of lens groups of the lens array layer is controlled to drive the display array layer to display a first group of viewpoint images; and in the second display phase, focal length of varifocal lens in the plurality of lens groups of the lens array layer is controlled to drive the plurality of display pixel sets in the display array layer to display a second group of viewpoint images. By means of driving the display device in such method, the freedom of the user for using the three-dimensional display device and the three-dimensional effects of the display image can be enhanced without reducing the physical resolution of the display device.

For example, in some embodiments of the present disclosure, each display pixel set includes one display pixel and each lens group includes one varifocal lens (for example microlens). The display device with such structure may be used as single eye stereoscopic display device. In such structure, in a same display phase, the varifocal lenses corresponding to one display pixel have a same focal length.

Each display pixel forms different viewpoints according to variation of the focal lengths of the corresponding varifocal lenses in different display phases, so that the eyes can create stereoscopic feeling. Since the added viewpoints are formed by varying the focal lengths of the lenses, the provided display device may increase the number of the viewpoints. The freedom of the user for using the display device and three-dimensional effects of the display image can be further improved without reducing resolution.

For example, in some embodiments of the present disclosure, each display pixel set includes one display pixel and each lens group includes two varifocal lenses (for example microlens). The display device with such structure may be used as two eyes stereoscopic display device. In such structure, in a same display phase, two varifocal lenses corresponding to one display pixel have different focal lengths from each other. In each of the display phases, viewpoints formed by the display pixel enter two eyes respectively by adjusting the focal lengths of two varifocal lenses corresponding to the same pixel. In different display phases, each display pixel form different viewpoints according to variation of the focal lengths of the corresponding varifocal lenses, so that the eyes can create stereoscopic feeling. Since the added viewpoints are formed by varying the focal lengths of the lenses, the provided display device may increase the number of the viewpoints. The freedom of the user for using the display device and three-dimensional effects of the display image can be further improved without reducing resolution.

For example, in some embodiments of the present disclosure, each display pixel set includes two display pixels and each lens group includes one varifocal lens (for example microlens). The display device with such structure may be used as two eyes stereoscopic display device. In each of the display phases, viewpoints formed by the varifocal lens for two display pixels enter two eyes respectively. In different display phases, each display pixel form different viewpoints according to variation of the focal lengths of the corresponding varifocal lenses, so that the eyes can create stereoscopic feeling. Since the added viewpoints are formed by varying the focal lengths of the lenses, the provided display device may increase the number of the viewpoints. The freedom of the user for using the display device and three-dimensional effects of the display image can be further improved without reducing resolution.

In order to explain the implementation of the technical solutions of the present application in detail, a plurality of embodiments will be provided below to illustrate the work principle of the display device of the present disclosure.

Figure 2A:
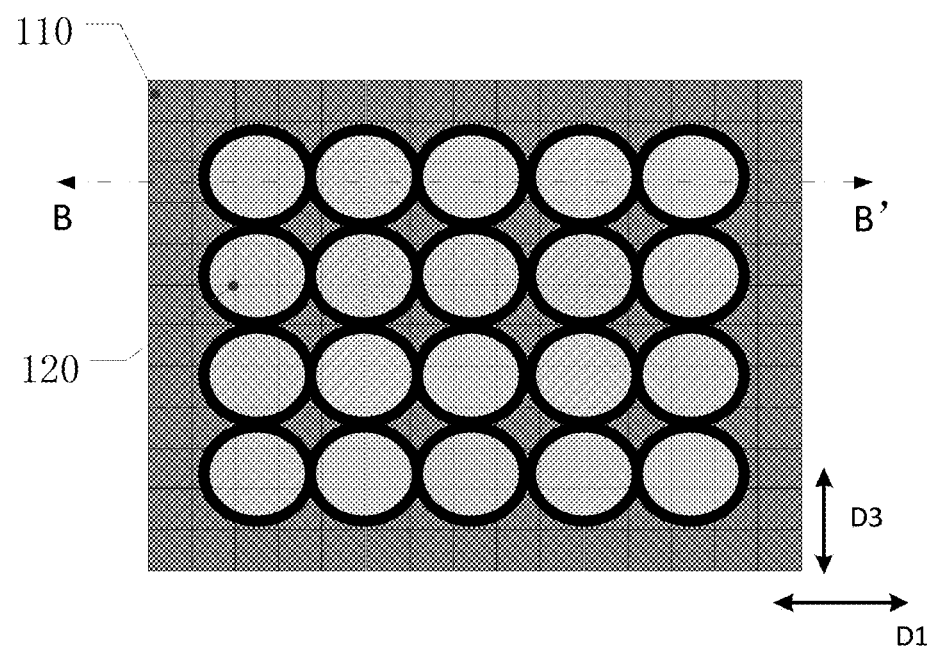
FIG. 2A is a schematic plan view showing a display device provided by an embodiment of the present disclosure.

An embodiment of the present disclosure provides a display device. For example, FIG. 2A and FIG. 2B respectively show a schematic plan view and a schematic cross-sectional view of the display device provided by an embodiment of the present disclosure. For example, the cross-sectional view shown in FIG. 2B is taken along a B-B' line shown in FIG. 2A. For example, as shown in FIG. 2A and FIG. 2B, the display device includes a display array layer 110 and a lens array layer 120. For example, the number of viewpoints corresponding to the display device (i.e., the number of positions of the display views formed by the display device and sensed by the eyes) may be increased by adjusting the focal lengths of the varifocal lenses 121 (for example microlens) included in the lens array layer 120.

For example, as shown in FIG. 2C and FIG. 2D, the display array layer 110 may include a plurality of display pixel sets 111 arranged in array. For example, each of the plurality of display pixel sets 111 may include at least two display pixels.

For example, the plurality of display pixel sets 111 may have the same number of the display pixels.

For example, as shown in FIG. 2C and FIG. 2D, each of the plurality of display pixel sets 111 may include a first display pixel 112, a second display pixel 113, a third display pixel 114, a fourth display pixel 1121, a fifth display pixel 1131, a sixth display pixel 1141, a seventh display pixel 1122, an eighth display pixel 1132 and a ninth display pixel 1142. That is, each of the plurality of display pixel sets 111 may include nine display pixels.

It should be noted that the number of the display pixels included in the display pixel set 111 in the embodiments of the present disclosure is not limited to nine. In accordance with practical requirement, each of the display pixel sets 111 may also include more or less display pixels. For example, each of the display pixel sets 111 may also include four display pixels or sixteen display pixels.

For example, the specific types and the light emitting principle of the display pixels may be set according to the practical application requirements. The embodiments of the present disclosure are also not intended to define them specifically. For example, each pixel unit may include a liquid crystal layer, i.e., the display array may be implemented as a liquid crystal display panel; again for example, each pixel unit may further include a self-luminescent layer (for example, an organic light emitting layer). For example, the display array may be implemented as an organic light emitting diode display panel or quantum point display panel.

For example, as shown in FIG. 2B, the lens array layer 120 is arranged at a light exit side of the display array layer 110 and includes a plurality of varifocal lenses 121 arranged in array. For example, each of the plurality of varifocal lenses 121 may be used as one lens group.

For example, the plurality of varifocal lenses 121 may be in one-to-one correspondence with the plurality of display pixel sets 111; each of the plurality of varifocal lenses 121 corresponds to at least two display pixels of each of the plurality of display pixel sets 111. For example, each of the plurality of varifocal lenses 121 may correspond to nine display pixels.

For example, as shown in FIG. 2A, the display pixel set 111 at the upper left corner of the display array layer 110 may correspond to the varifocal lens 121 at the upper left corner of the lens array layer 120; and again for example, the display pixel set 111 at the lower right corner of the display array layer 110 may correspond to the varifocal lens 121 at the lower right corner of the lens array layer 120.

It should be noted that the plurality of varifocal lenses 121 being in one-to-one correspondence with the plurality of display pixel sets 111 means that lights emitted from the plurality of display pixels included in each of the plurality of display pixel set 111 may be transmitted via the corresponding one varifocal lens 121 and configured to form different viewpoints (see FIG. 5), instead of limiting each of the plurality of display pixel sets 111 to be overlapped fully with the corresponding varifocal lens 121 in a direction perpendicular to the display array.

For example, the varifocal lens 121 has a profile including a spherical surface, a non-spherical surface or a free curve surface. The varifocal lens 121 is not limited to double convex spherical lens shown in FIG. 3A. For example, in accordance with practical application requirements, the varifocal lens may also be such as a flat convex lens, thereby it may reduce difficulty for producing the lens array layer 120.

For example, in accordance with practical application requirements, the profile of the varifocal lens 121 may also be a non-spherical surface or a free curve surface, and thus may correct the aberration of the display device, and may further improve the quality of the image displayed.

Figure 3A:
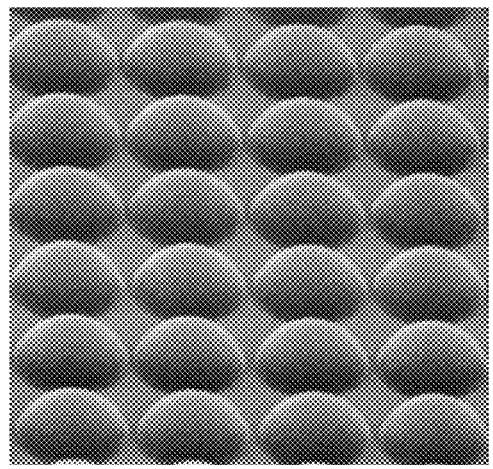
FIG. 3A is a schematic view showing a lens array layer.
Figure 3B:
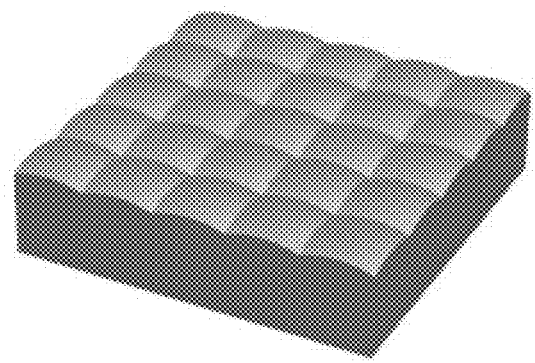
FIG. 3B is a schematic view showing another lens array layer.
Figure 3C:
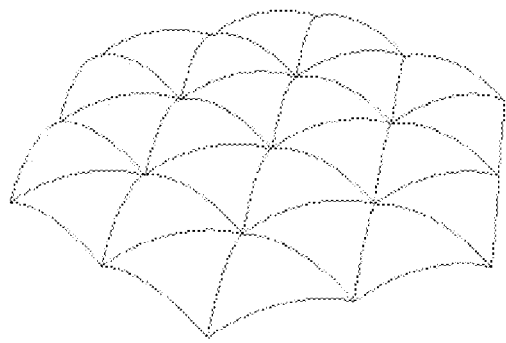
FIG. 3C is a schematic view showing a further lens array layer.
Figure 3D:
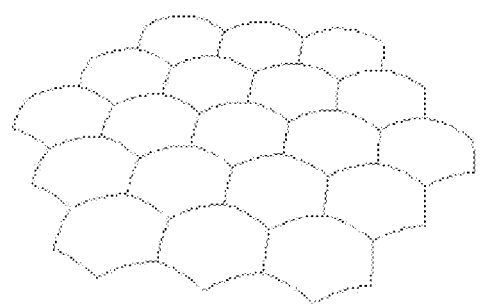
FIG. 3D is a schematic view showing a yet further lens array layer.

For example, FIG. 3A shows an exemplified top view of the lens array layer 120 shown in FIG. 2A and FIG. 2B. Obviously, the arrangement of array of the plurality of varifocal lenses 121 has a form which is not limited to the form shown in FIG. 3A. For example, the plurality of varifocal lenses 121 may also be arranged in rectangle (see FIG. 3B), in triangle (see FIG. 3C) or in hexagon (see FIG. 3D). For example, there are no gaps between the plurality of varifocal lenses 121, that is, the adjacent varifocal lenses 121 contact with each other. It should be noted that FIG. 3A to FIG. 3D are intended to explain shapes of the lens array in one focal length, instead of limiting it to be the array of varifocal lenses.

For example, each of the plurality of varifocal lenses 121 has a focal length and a clear aperture which may be set in accordance with the practical application requirements. The embodiments of the present disclosure do not limit this specifically. For example, the focal length of the each of the plurality of varifocal lenses 121 may be in a range between 2 millimeters and 9 centimeters (for example, 3 millimeters to 5 millimeters or 4 centimeters to 6 centimeters). For example, the clear aperture of each of the plurality of varifocal lenses 121 may be located between 30 micrometers to 3 centimeters 3 (for example, 50 micrometers to 80 micrometers or 0.6 centimeter to 0.9 centimeter); for example, in case that the aperture is relatively large, the number of the display pixels corresponding to each of the plurality of varifocal lenses 121 may be relatively large. Thereby, in any one display phase of the display device, the number of viewpoints formed by the display device is relatively large.

Figure 3E:
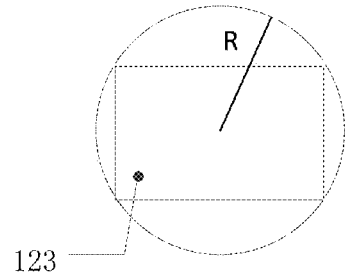
FIG. 3E is an arrangement defining a clear aperture of a lens.

It should be noted that in case that orthographic projection of the varifocal lens 121 onto the display array layer 110 is circular, the aperture of the varifocal lens 121 is a radius of the above circular orthographic projection; and in case that orthographic projection of the varifocal lens 121 onto the display array layer 110 is not circular, as shown in FIG. 3E, the aperture of the varifocal lens 121 is the minimum radius of a circle which can include the non-circular orthographic projection 123.

For example, the varifocal lens 121 on the lens array layer 120 may be composed of a plurality of layers to adjust the focal length more finely.

For example, the principle of adjusting the focal length of the specific structure of the lens array layer 120 may be set as practical application requirements. The embodiments of the present disclosure are not intended to limit them specifically.

Figure 4A:
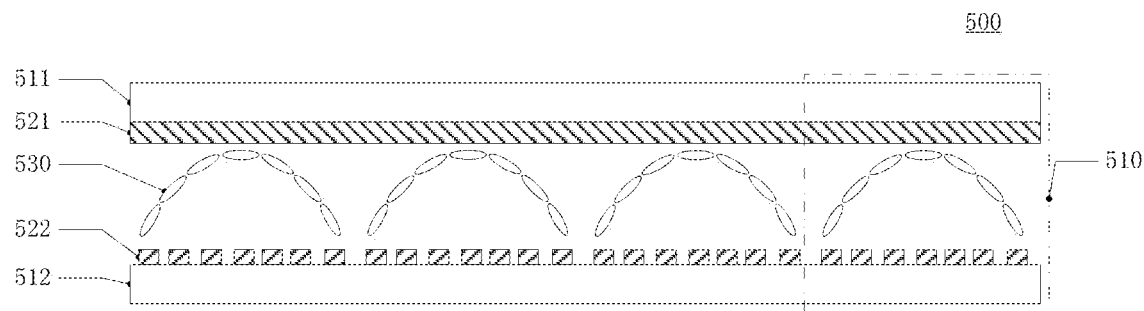
FIG. 4A is an exemplified view showing a structure of a liquid crystal lens array.

For example, as shown in FIG. 4A, the lens array layer 120 may be implemented as a liquid crystal lens array, that is, each of the plurality of varifocal lenses 121 may include a liquid crystal lens, such as a liquid crystal microlens. For example, FIG. 4A shows a schematic cross-sectional view of a liquid crystal lens. For example, as shown in FIG. 4A, the liquid crystal lens array 500 includes a first substrate 511 and a second substrate 512 opposed to each other and a liquid crystal layer 530 between the first substrate 511 and the second substrate 512. For each liquid crystal lens unit 510, for example a planar electrode 521 is arranged on the first substrate 511 and for example stripe electrodes 522 are arranged on the second substrate 512. These stripe electrodes 522 may at least partly be applied with different voltages such that liquid crystal molecules can be driven to have different deflection degrees so as to obtain lens units with different focal lengths.

Figure 4B:
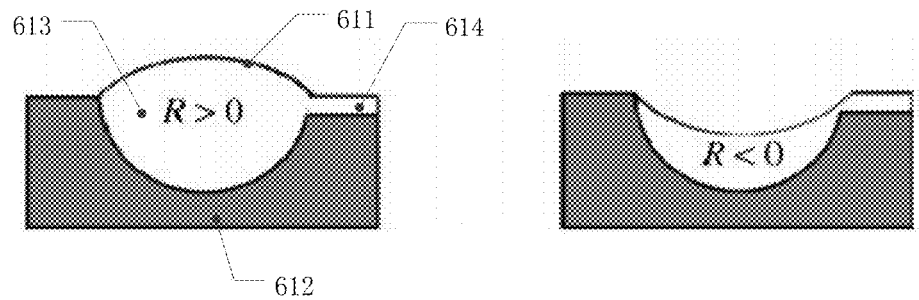
FIG. 4B is an exemplified view showing a structure of a liquid lens.

For example, as shown in FIG. 4B, the lens array layer 120 may also be implemented as a liquid crystal lens array, that is, each of the plurality of varifocal lenses 121 may include a liquid varifocal lens. For example, FIG. 4B shows a schematic cross-sectional view of a liquid lens. For example, as shown in FIG. 4B, the liquid varifocal lens may include a transparent elastic film 611, a transparent substrate 612, transparent liquid 613 arranged in cavity composed of the transparent elastic film 611 and the transparent substrate 612 and injection holes 614. For example, the focal length of the liquid varifocal lens may be changed by changing volume of the transparent liquid 613 in the cavity. For example, in case that the lens array layer 120 is implemented as a liquid varifocal lens array, the implementation of the liquid varifocal lens is not limited to the structure shown in FIG. 4B. For example, the liquid varifocal lens may also be implemented as double liquid lenses based on Electrowetting on Dielectric (EWOD) principle. For example, principle and the specific implementation of the liquid varifocal lens may be referred to the conventional implementations of the liquid varifocal lens. The details will be omitted herein.

Figure 5:
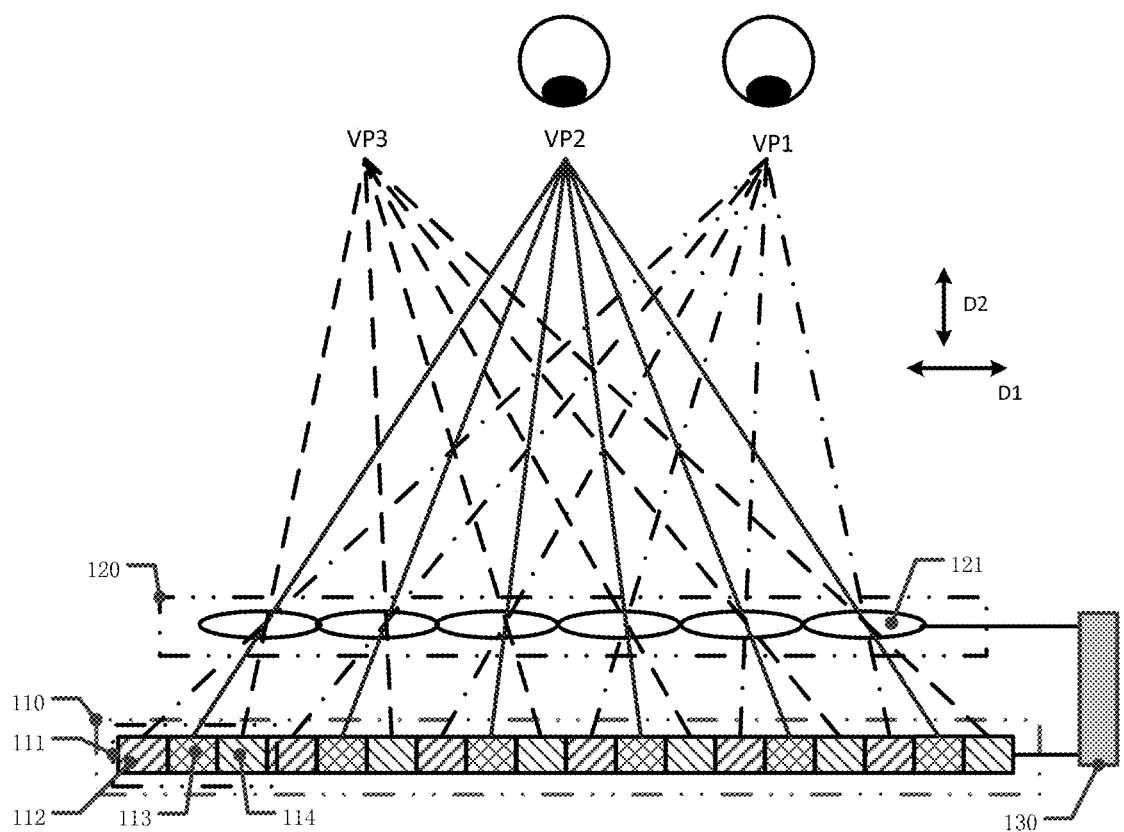
FIG. 5 is an exemplified view showing an optical path of the display device shown in FIG. 2A.

For example, FIG. 5 shows a view of an exemplified optical diagram of the display device shown in FIG. 2B. For example, as shown in FIG. 5, the first display pixel 112 of each display pixel set 111 is used to form a first viewpoint VP1; the second display pixel 113 of each display pixel set 111 is used to form a second viewpoint VP2; and the third display pixel 114 of each display pixel set 111 is used to form a third viewpoint VP3. For example, when the eyes see the image formed at the first viewpoint VP1 and the image formed at the second viewpoint VP2, the brain may combine one three-dimensional image (the first stereoscopic image); again for example, when the eyes see the image formed at the second viewpoint VP2 and the image formed at the third viewpoint VP3, the brain may combine another three-dimensional image (the second stereoscopic image). The second stereoscopic image is slightly different from the first stereoscopic image.

It should be noted that in accordance with practical application requirements, the display device may be configured as the following form such that the user can see two viewpoint images that are not adjacent to each other. For example, when the user is located a first position, the left eye and the right eye can see the image formed at the first viewpoint VP1 and the image formed at the third viewpoint VP3 respectively; when the user is located a second position, the left eye and the right eye can see the image formed at the second viewpoint VP2 and the image formed at the fourth viewpoint at the right side of the second viewpoint VP2 respectively.

For example, the focal length of the varifocal lens 121 may vary as time elapses. Correspondingly, each display pixel is configured to form different viewpoints at different display phases (for example, the first display phase and the second display phase) respectively as a function of variation of the focal length of the corresponding varifocal lens 121. For example, for the sake of clarity, the principle of increasing the number of the viewpoints of the display device provided by the embodiments of the present disclosure will be explained by ways of examples with reference to one lens (such as microlens) and two display pixels (that is, the first display pixel 112 and the second display pixel 113) shown in FIG. 6A and FIG. 6B.

Figure 6A:
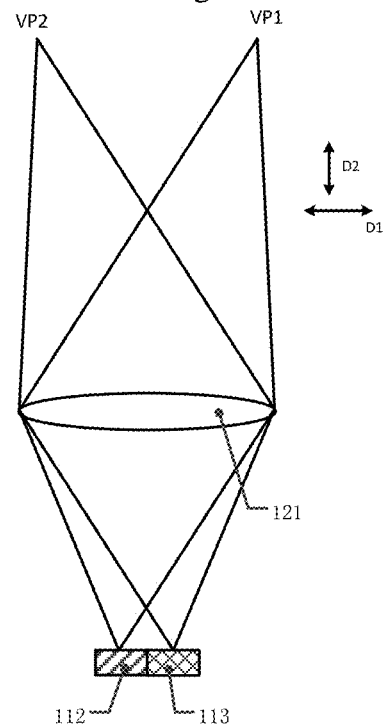
FIG. 6A is a schematic view showing an exemplified optical path in case that the focal length of the lens is a first focal length.

For example, as shown in FIG. 6A, in the first display phase, the focal length of each lens may be a first focal length f1, and the first display pixel 112 displays an image pixel of the first viewpoint image and a light emitted from the first display pixel 112 is refracted by a lens with a focal length which is equal to the first focal length to form the first viewpoint VP1; the second display pixel 113 displays an image pixel of the second viewpoint image and a light emitted from the second display pixel 113 is refracted by a lens with a focal length which is equal to the first focal length to form the second viewpoint VP2. For example, as shown in FIG. 6B, in the second display phase, the focal length of each lens may be a second focal length f2, and the first display pixel 112 displays an image pixel of the first new viewpoint image and a light emitted from the first display pixel 112 is refracted by a lens with a focal length which is equal to the second focal length to form a first new viewpoint VP1'; the second display pixel 113 displays an image pixel of a second new viewpoint image and a light emitted from the second display pixel 113 is refracted by a lens with a focal length which is equal to the second focal length to form a second new viewpoint VP2'.

For example, the focal length of the lens may vary at high frequency (refresh), and correspondingly, the display array layer 110 may refresh images at high frequency. For example, in case that the refresh frequency of the focal length of the lens and the image refresh frequency of the display array layer 110 are both 120 Hz, the image refresh frequencies at the first viewpoint VP1, the second viewpoint VP2, the first new viewpoint VP1' and the second new viewpoint VP2' may all be 60 Hz. Thus, the images formed at the first viewpoint VP1, the second viewpoint VP2, the first new viewpoint VP1' and the second new viewpoint VP2' are all continuous images for the user. Thus, the display device provided by the embodiments of the present disclosure may increase number of viewpoints. Further, the freedom of the user for using the display device and three-dimensional effect of the display image can be further improved without reducing resolution.

Figure 6B:
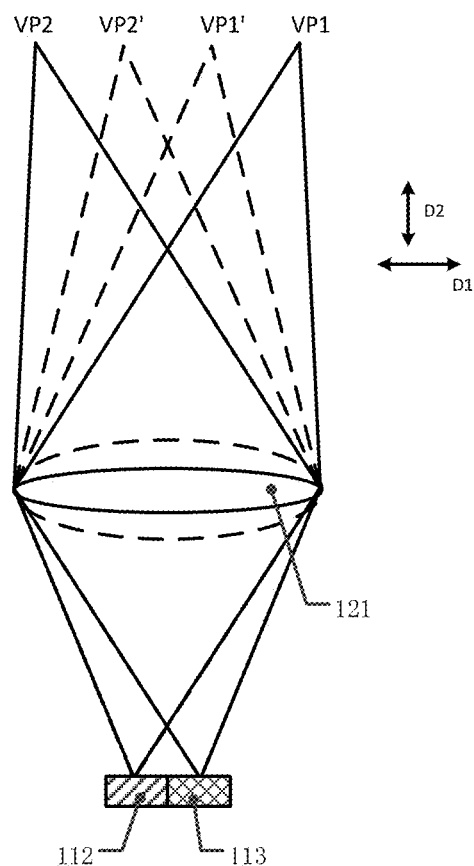
FIG. 6B is a schematic view showing an exemplified optical path in case that the focal length of the lens is a second focal length.

It should be noted that, for the sake of clarity, by way of examples, FIG. 6B shows the positions of the first new viewpoint VP1' and the second new viewpoint VP2' move with respect to the first viewpoint VP1 and the second viewpoint VP2 in a first direction D1. However, the embodiments of the present disclosure are not limited to this. For example, according to practical application requirements, the positions of the first new viewpoint VP1' and the second new viewpoint VP2' may also move with respect to the first viewpoint VP1 and the second viewpoint VP2 in a third direction D3 (that is, in a direction perpendicular to the first direction D1 and the second direction D2, see FIG. 2A); and again for example, according to practical application requirements, the positions of the first new viewpoint VP1' and the second new viewpoint VP2' may also move with respect to the first viewpoint VP1 and the second viewpoint VP2 in a second direction D2.

For example, as shown in FIG. 2B, the display device may further include a controller 130. For example, the controller 130 may be configured such that each display cycle of the display device includes a plurality of display phases (for example, the first display phase and the second display phase), and the controller 130 may be configured such that a plurality of varifocal lenses 121 in a same display phase have the same focal length and such that the varifocal lenses 121 each have different focal lengths in different display phases, or the focal length of each of the varifocal lenses 121 varies as the display phase varies. The controller 130 may also be configured such that the refresh frequency of the display array layer 110 is not less than the refresh frequency of the lens array layer 120. It may cause that a speed of variation of the display image of the display array layer 110 is not less than a speed of variation of the focal length of the lens, so as to prevent the variation of the image from lagging behind the variation of the focal length of the lens. It is helpful to achieve the three-dimensional display sufficiently using persistence of the eyes' vision. As an example, the controller 130 may also be configured such that variation of the focal length of the lens is synchronous with variation of display images of the display array layer 110, so as to achieve accurate matching between variation of display images and viewpoints.

For example, the controller 130 may be implemented as logic circuits such as a central processor CPU, a digital signal processor DSP, a microcontroller unit MCU, an application specific integrated circuit ASIC, a programmable logic controller PLC or other various processors having functions of executing instructions.

For example, a distance between the display array layer 110 and the lens array layer 120 in a direction perpendicular to the display array layer 110 may be set as practical application requirements. The embodiments of the present disclosure are not intended to limit this. For example, the a distance between the display array layer 110 and the lens array layer 120 in a direction perpendicular to the display array layer 110 may be equal to an average value of focal lengths of all of the varifocal lenses 121 in time domain (within a certain time period). In this way, the size of each image pixel of the display image may be enhanced, so as to further improve the display effect of the display device.

For example, in case that each display cycle includes the first display phase (time duration t1) and the second display phase (time duration t2) and each lens has the focal length which is the first focal length f1 in the first display phase and is the second local length f2 in the second display phase, the distance d between the display array layer 110 and lens array layer 120 in a direction perpendicular to the display array layer 110 satisfies the following equation, i.e., $d=(f1 \times t1 + f2 \times t2)/(t1+t2)$. For example, in case that the time duration t1 in the first display phase is equal to the time duration t2 in the second display phase, $D=(f1+f2)/2$. For example, each display cycle further includes a third display phase (time duration t3) and in case that the focal length of the third display phase is the third focal length f3, the distance d between the display array layer 110 and lens array layer 120 in a direction perpendicular to the display array layer 110 satisfies the following equation, i.e., $d=(f1 \times t1 + f2 \times t2 + f3 \times t3)/(t1+t2+t3)$.

It should be noted that number of the display phases included in each display cycle in the embodiments of the present disclosure is not limited to two or three, and in accordance with the practical application requirements, each display cycle may also include more display phases, for example, each display cycle includes six display phases or nine display phases, so as to further increase the number of viewpoints of the display device.

The embodiment of the present disclosure further provides a method for driving the display device. For example, each display cycle of the above display device may include the first display phase and the second display phase in sequence. For example, the above driving method may include the following steps:

Step S110: in the first display phase, driving the display array layer 110 to display a first group of viewpoint images and driving the lens array layer 120 to make the focal lengths of the plurality of lenses 121 be equal to the first focal length; and Step S120: in the second display phase, driving the plurality of display pixel sets 111 in the display array layer 110 to display a second group of viewpoint images and driving the lens array layer 120 to make the focal lengths of the plurality of lenses 121 be equal to the second focal length.

For example, the number of the viewpoint images included in the first group of viewpoint images and the number of the viewpoint images included in the second group of viewpoint images are both equal to the number of the display pixels corresponding to each of the plurality of varifocal lenses 121. For example, regarding the display device shown in FIG. 2A, the number of the viewpoint images included in the first group of viewpoint images and the number of the viewpoint images included in the second group of viewpoint images are both equal to nine. For example, the viewpoint images included in the first group of viewpoint images are different from those included in the second group of viewpoint images.

For example, the step S110 includes driving image pixels located at a same position or a corresponding position in respective display pixel sets 111 to display the image pixels corresponding to the same viewpoint image, for example, driving the first display pixel 112 to display image pixels corresponding to a first viewpoint image; and driving the second display pixel 113 to display image pixels corresponding to a second viewpoint image. For example, the step S110 further includes driving the lens array layer 120 such that the focal lengths of a plurality of lenses are both the first focal length f1, for example, the lights emitted from a plurality of first display pixels 112 are refracted by the lens with the focal length which is equal to the first focal length to form the first viewpoint VP1 and the lights emitted from a plurality of second display pixels 113 are refracted by the lens with the focal length which is equal to the first focal length to form the second viewpoint VP2. For example, the lights emitted from a plurality of display pixels, i.e., the third display pixel 114 to the ninth display pixel 1142 are refracted by the lens with the focal length which is the first focal length to form the third viewpoint VP3 to the ninth viewpoint VP9 respectively.

For example, the step S120 includes driving display pixels located at a same position in respective display pixel sets 111 to display the image pixels corresponding to the same viewpoint image, for example, driving the first display pixel 112 to display image pixels corresponding to a first new viewpoint image; and driving the second display pixel 113 to display image pixels corresponding to a second new viewpoint image. For example, the step S120 further includes driving the lens array layer 120 such that the focal lengths of a plurality of lenses are both the second focal length f2 which is not equal to the first focal length f1. For example, the lights emitted from a plurality of first display pixels 112 are refracted by the lens with the focal length which is equal to the second focal length to form the first new viewpoint VP1' and the lights emitted from a plurality of second display pixels 113 are refracted by the lens with the focal length which is equal to the second focal length to form the second new viewpoint VP2'. For example, the lights emitted from a plurality of display pixels, i.e., the third display pixel 114 to the ninth display pixel 1142 are refracted by the lens with the focal length which is the second focal length to form the third new viewpoint to the ninth new viewpoint respectively, that is, the number of viewpoints of the display device may be increased to 18.

For example, as practical application requirements, each display cycle may further include a third display phase following the second display phase. For example, the above method may also include the following step S130.

Step S130: in the third display phase, driving the display array layer 110 to display a third group of viewpoint images and driving the lens array layer 120 to make the focal lengths of the plurality of lenses be equal to the third focal length.

For example, the number of the viewpoint images included in the third group of viewpoint images is equal to the number of the display pixels corresponding to each of the plurality of varifocal lenses 121. For example, regarding the display device shown in FIG. 2A, the number of the viewpoint images included in the third group of viewpoint images is equal to nine. For example, the viewpoint images included in the third group of viewpoint images are different from both those included in the first group of viewpoint images and those included in the second group of viewpoint images.

For example, in the step S130, the lens array layer 120 is driven such that the focal lengths of the plurality of lenses are equal to a third focal length which is neither equal to the first focal length, nor equal to the second focal length. For example, the number of the viewpoints of the display device may be increased to 27 by driving the display array layer 110 to display the third group of viewpoint images.

For example, the refresh frequency of the display array layer 110 may be equal to the refresh frequency of the lens array layer 120, that is, when the display array layer 110 refreshes display images at once, correspondingly, the lens array layer 120 also refreshes the focal length at once (that is, the original focal length of the lens is changed into a new focal length).

For example, according to practical application requirements, the refresh frequency of the display array layer 110 may also be greater than the refresh frequency of the lens array layer 120. For example, in the first display phase, the display array layer 110 may also be driven to display a first group of intermediate images after the display array layer 110 displays the first group of viewpoint images; again for example, in the second display phase, the display array layer 110 may also be driven to display a second group of intermediate images after the display array layer 110 displays the second group of viewpoint images. Thereby, the refresh frequency of the lens array layer 120 may be reduced.

For example, the display device and the method for driving the display device provided by the present embodiment may further increase number of viewpoints without reducing resolution. In this way, the freedom of the user for using the display device and the three-dimensional effect of the display image can be improved without reducing resolutions.

Figure 7:
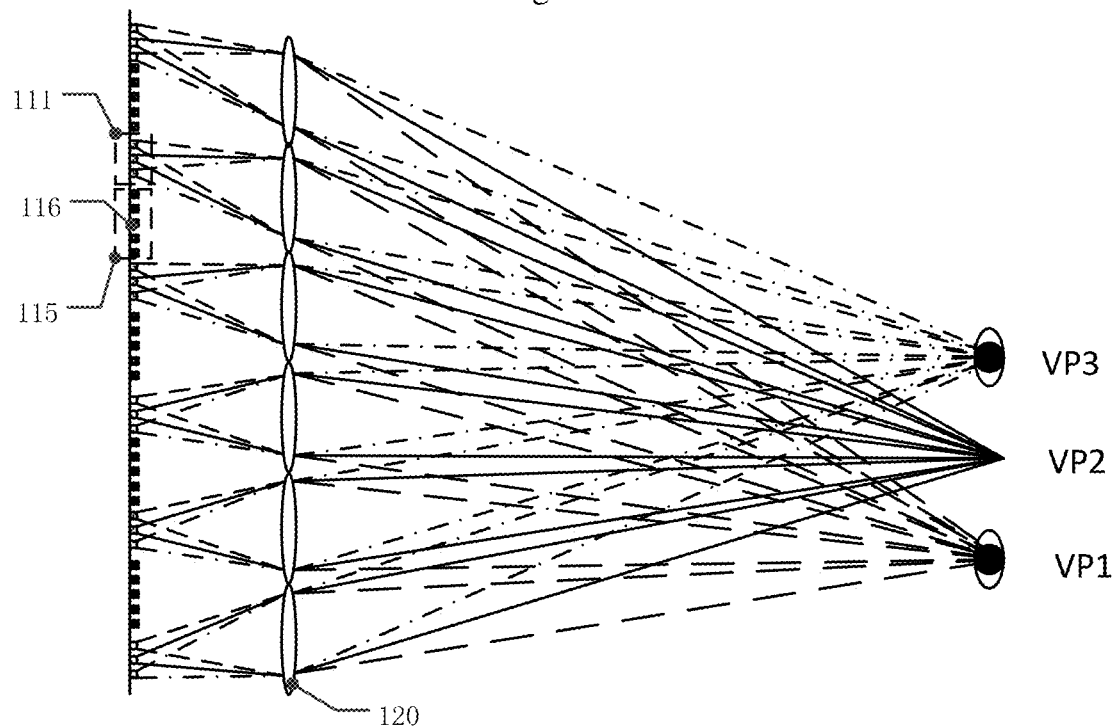
FIG. 7 is a schematic cross-sectional view showing a display device provided by another embodiment of the present disclosure.

An embodiment of the present disclosure may also provide a display device. The display device may for example be implemented as such as a cell phone, a television, a display, a tablet computer. For example, FIG. 7 shows a schematic cross-sectional view of the display device provided by the embodiment. For example, the display device shown in FIG. 7 is similar to the display device shown in FIG. 2B. Therefore, the embodiments will describe the distinctions from those shown in FIG. 2B and the repeated portion will be omitted herein.

For example, as shown in FIG. 7, the display device includes the display array layer 110 and the lens array layer

120. For example, as shown in FIG. 7, the display array layer 110 may further include a plurality of spacing pixel sets 115 and each of the plurality of spacing pixel sets 115 is arranged between adjacent display pixel sets 111 and includes a plurality of spacing pixels 116.

For example, when the display device is driven to display images, the plurality of spacing pixel sets 115 are kept to be non-luminous. In this way, the view range of the display device may be reduced, so as to improve confidentiality of the display device. With reference FIG. 8, the principle of improving confidentiality of the display device provided by the embodiments will below be described by way of examples.

Figure 8:
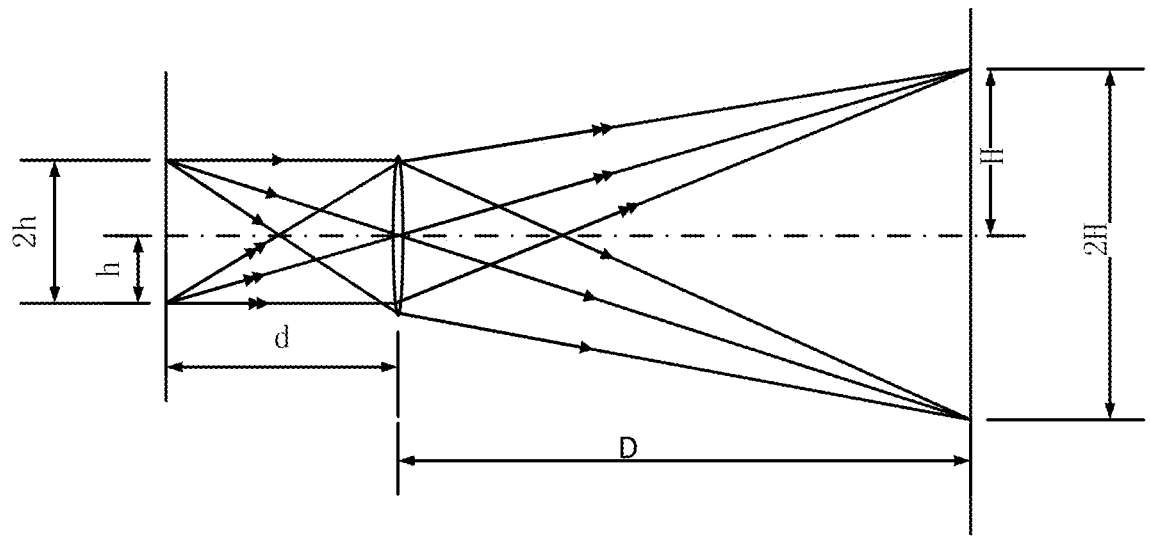
FIG. 8 is a schematic view of an exemplified optical path showing relation between the display pixel set and a sensing range.

For example, as shown in FIG. 8, the distance between the display array and the lens is d, and the distance between an observation plane and the lens is D. In case that the width of each of the display pixel sets 111 in the first direction D1 is 2h, the display device has an observation range of 2H=2h×(D/d). Thus, in case that the distance d between the display array and the lens and the distance D between the observation plane and the lens are fixed, the observation range 2H of the display device decreases as the width 2h of each of the display pixel sets 111 decreases. Further, confidentiality of the display device may be improved by providing spacing pixel sets 115 and keeping the plurality of spacing pixel sets 115 of the display array layer 110 to be non-luminous.

Figure 9A:
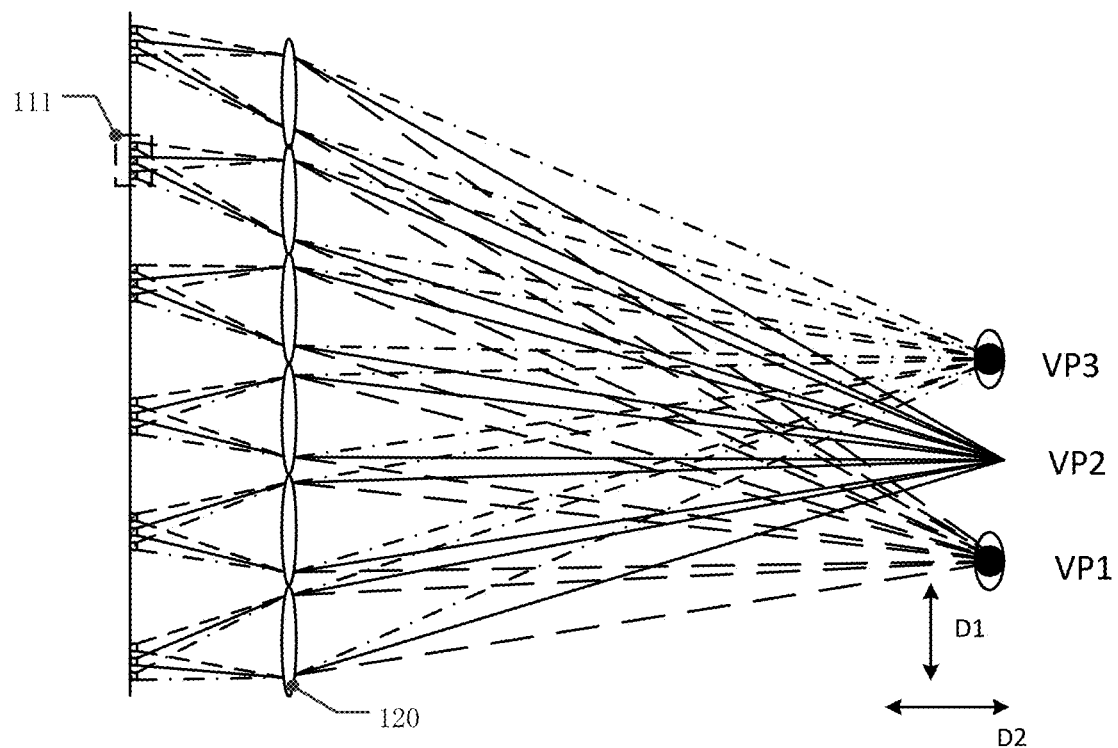
FIG. 9A is a schematic cross-sectional view showing a display device provided by a further embodiment of the present disclosure.

An embodiment of the present disclosure also provides a display device. For example, FIG. 9A shows a schematic cross-sectional view of the display device provided by the embodiment. For example, the display device shown in FIG. 9A is similar to the display device shown in FIG. 2B. Thus, in the present embodiment, only distinction between them will be described and the repeated portion will be omitted.

Figure 9B:
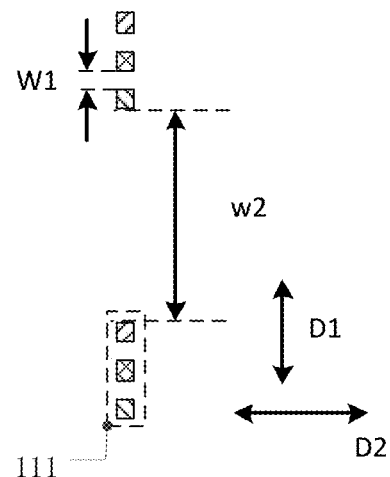
FIG. 9B is a locally enlarged view of the display device shown in FIG. 9A.

For example, as shown in FIG. 9A and FIG. 9B, the distance w1 between adjacent display pixels in each of display pixel sets 111 is less than distance w2 between adjacent display pixel sets 111. Therefore, for the display device shown in FIG. 9A, in case that the display pixels have a fixed size, the size of each of the display pixel sets (size in the first direction D1) and the observation range of the display device may be reduced, so as to improve confidentiality of the display device.

Figure 9C:
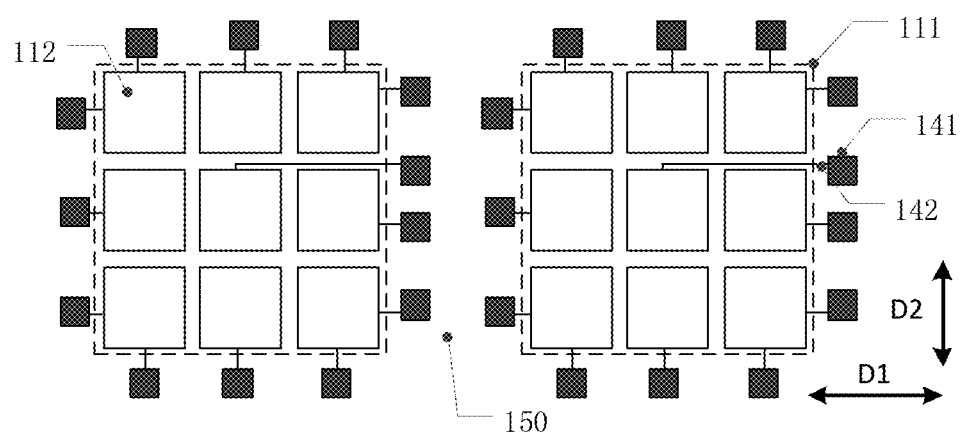
FIG. 9C is a schematic plan view of the display device shown in FIG. 9A.

For example, as shown in FIG. 9C, the display array layer 110 may further include a spacing region 150. The spacing region 150 is arranged to surround the plurality of display pixel sets 111. The spacing region 150 is a non-display region. For example, as shown in FIG. 9C, the display array layer 110 may further include a driving element 141. The driving element 141 may for example include a thin film transistor. For example, the driving element 141 may for example be located in the spacing region 150. In this way, more display pixels may be provided in the display pixel set 111, so as to increase resolution of the display device. For example, each driving element 141 may be connected with to the corresponding display pixel by wires 142.

Figure 10A:
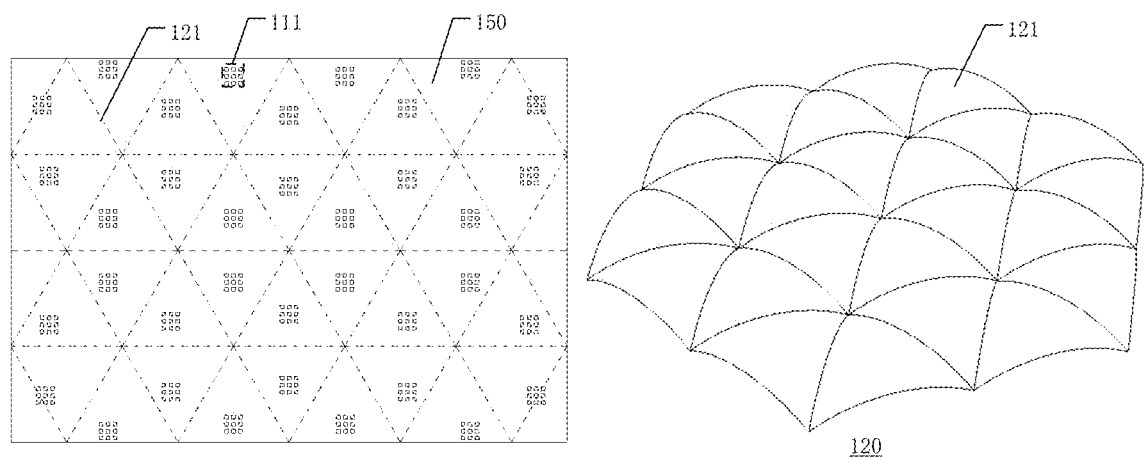
FIG. 10A is a view showing an arrangement of display pixel sets of the display device shown in FIG. 9A.
Figure 10B:
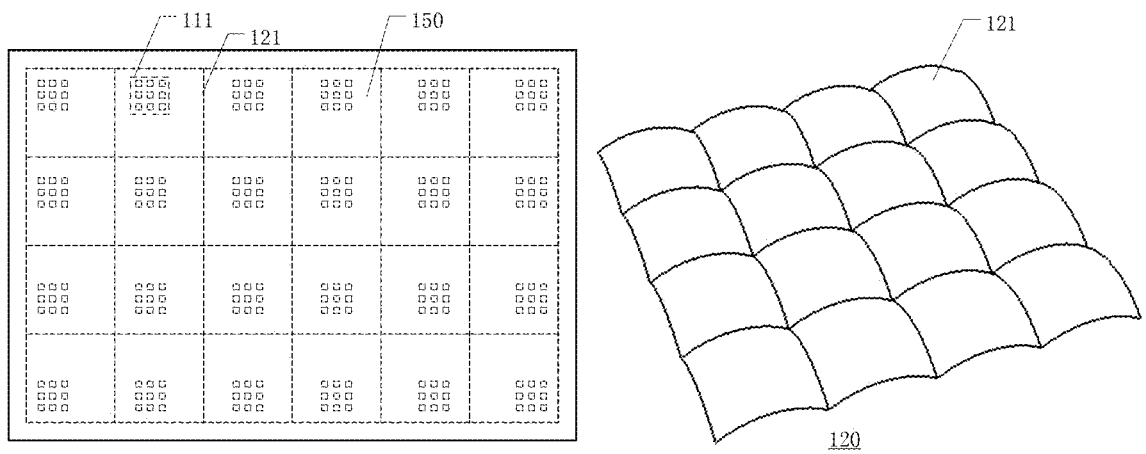
FIG. 10B is a view showing another arrangement of display pixel sets of the display device shown in FIG. 9A.
Figure 10C:
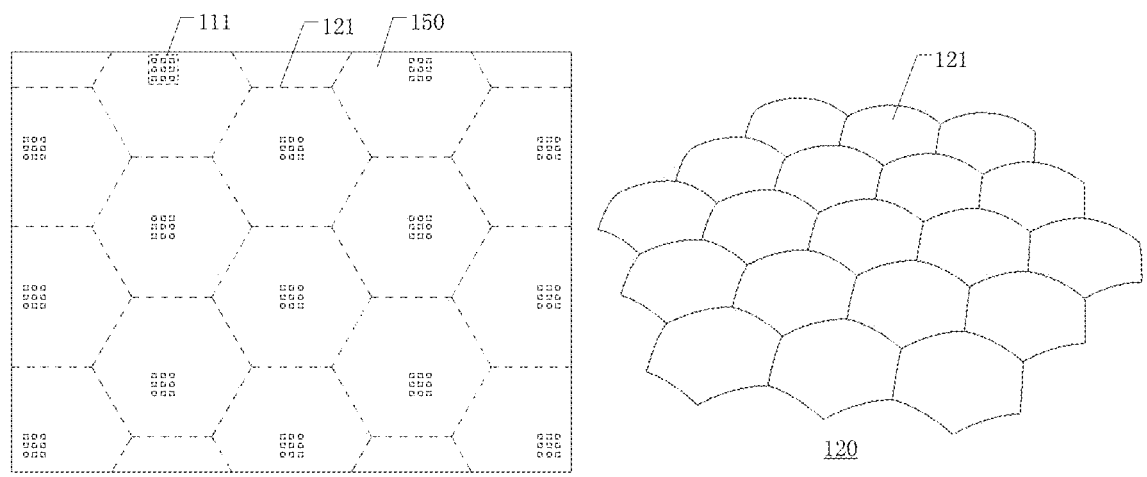
FIG. 10C is a view showing a further arrangement of display pixel sets of the display device shown in FIG. 9A.

For example, as shown in FIG. 10A to FIG. 10C, the plurality of varifocal lenses 121 may be arranged in a form of a triangle (see FIG. 10A), a rectangle (see FIG. 10B) or a hexagon (see FIG. 10C). For example, as shown in FIG. 10A to FIG. 10C, the plurality of display pixel sets 111 may be arranged non-uniformly in a display face of a display panel, thereby, a light beam emitted from the display pixels at the same position in the display pixel set 111 may be converged at the same viewpoint, so as to improve the imaging quality. In each of FIG. 10A to 10C, the graph at the right side is a three dimensional view which shows arrangement of the varifocal lenses 121 in the lens array layer 120 while the graph at the left side is a top view which shows position relationship between the varifocal lenses 121 and each of the display pixel set 111 and the spacing region 150, where profiles of the varifocal lenses 121 are represented schematically by dashed lines.

For example, the display device provided by the embodiments not only can improve confidentiality of the display device, but also can increase resolution of the display device.

Figure 11A:
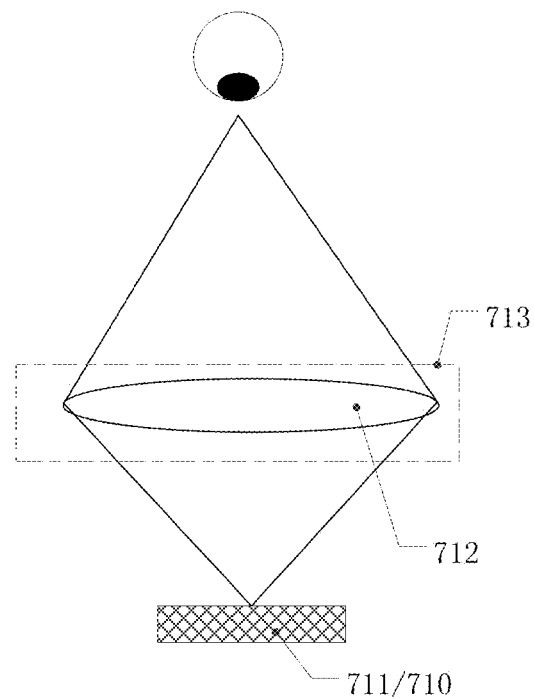
FIG. 11A is a schematic cross-sectional view showing a display device provided by a further embodiment of the present disclosure.

An embodiment of the present disclosure also provides a display device. In an embodiment of the present disclosure, the display device may be implemented as a single eye stereoscopic visual display device. As illustrated in FIG. 11A, the display device includes the display array layer and the lens array layer. The display array layer includes a plurality of display pixel sets 710. Each of the plurality of display pixel sets 710 includes one display pixel 711. The lens array layer is arranged at the light exit side of the display array layer, and includes a plurality of varifocal lens groups 713 arranged in array. Each of the plurality of varifocal lens groups 713 includes one varifocal lens 712 and each display pixel 711 corresponds to one varifocal lens 712.

For example, the single eye stereoscopic vision has a principle different from that of the double eyes stereoscopic vision. For the double eyes stereoscopic vision, due to distance between two eyes, the position of the left eye and the position of the right eye with respect to a same object are different from each other. In this way, parallax is produced between double eyes to cause the left eye sees an image different from the image that the right eye sees. Thus, when both eyes observe the same object, the both eyes have a same point of attention on the object such that the left eye, the right eye and the point of attention on the object form a triangle, so as to form the distance feeling of the eye to the object. In such circumstance, the muscle of eyes drags the eyeball to rotate and activity of the muscle feed back to the brain such that the parallax image obtained by both eyes form a stereoscopic feeling combined in the brain. For the single eye, although the stereoscopic feeling similar to both eyes cannot be formed, the single eye has another physiological adjusting mechanism, i.e., active adjustment of focal length for the eyes. A crystalline lens of an eye may be adjusted by the contraction and diastole of the muscle connected to the crystalline lens. Variation of the focal length of the crystalline lens causes one eye may see scenes at different distances and portions of a same scene at different depths. In this process, information on movements of the muscle attached to the crystalline lens is fed back to the brain to enhance stereoscopic feeling. On a basis of such physiological mechanism, in the single eye stereoscopic visual display device provided by the present embodiment, when one pixel corresponds to one lens, the quick variation of the focal length of the lens causes the viewpoints formed by one pixel to have a certain difference on retinas of the eyes. Such difference between the viewpoints may adjust the crystalline lenses of the eyes correspondingly, so as to achieve stereoscopic feeling in depth on the basis of the above mechanism. Thus, the display device provided by the present embodiments can achieve single eye stereoscopic display without reducing physical resolution.

For example, in order that the viewpoints formed by the lenses do not go beyond field of view, the viewpoints caused by the variation of the focal length of the same varifocal lens at adjacent times are deviated from each other without going beyond the width of pupils of the eyes.

Figure 11B:
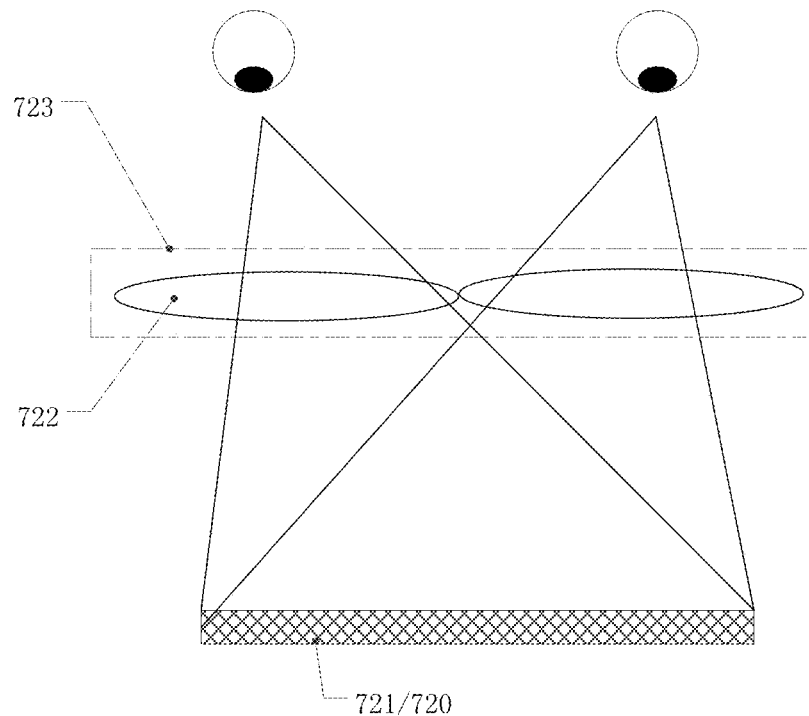
FIG. 11B is a schematic cross-sectional view showing a display device provided by a yet further embodiment of the present disclosure.

An embodiment of the present disclosure also provides a display device. As shown in FIG. 11B, the display device includes the display array layer and the lens array layer. The display array layer includes a plurality of display pixel sets 720. Each of the plurality of display pixel sets 720 includes one display pixel 721. The lens array layer is arranged at the light exit side of the display array layer, and includes a plurality of lens groups 723 arranged in array. Each of the lens groups includes two varifocal lenses 722 which have different focal lengths from each other. For example, each display pixel 721 corresponds to the two varifocal lenses 722.

For example, for the display pixel 721, by configuring two lenses with different focal lengths for it, two images formed by the same pixel are located in the left eye and right eye, respectively, thereby it can achieve stereoscopic vision.

For example, in order that the viewpoints formed by the lens do not go beyond the field of view, at adjacent times, the deviation of viewpoints caused by the variation of the focal length of the same varifocal lens will not go beyond the width of pupils of the eyes.

At least one embodiment of the present disclosure provides a display device. The display device includes the display array layer and the lens array layer. The display array layer includes a plurality of display pixels. The lens array layer is arranged at a light exit side of the display array layer and includes a plurality of varifocal lenses arranged in array, each of the plurality of lenses corresponding to at least two display pixels. Each display pixel is configured to form different viewpoints at different display phases respectively on a basis of variation of focal lengths of the corresponding varifocal lenses. The display device may increase the number of viewpoints of the display device without reducing resolution.

At least one embodiment of the present disclosure also provides a method for driving the display device as described above. Each display cycle sequentially includes a first display phase and a second display phase. The driving method includes: in the first display phase, driving the display array layer to display a first group of viewpoint images and driving the lens array layer such that focal lengths of the plurality of lenses are the first focal length; in the second display phase, driving a plurality of display pixel sets of the display array layer to display a second group of viewpoint images and driving the lens array layer such that focal lengths of the plurality of lenses are the second focal length. The first focal length is not equal to the second focal length. The method for driving the display device may increase the number of viewpoints of the display device without reducing resolution.

In the above embodiments of the present disclosure, for example, different display pixels in the same display pixel set correspond to different viewpoints respectively. As an example, the above varifocal lenses may for example be microlenses, such as liquid crystal microlenses or liquid microlenses. For example, the above lens groups may be fully composed of varifocal lenses.

Notes are provided in the following aspects:

In drawings for embodiments of the present disclosure, only structures directed to the embodiments of the present disclosure are shown and other structures may be referred to the conventional designs.

Without conflictions, features of the same embodiment of the present disclosure and different embodiments may be combined with each other.

Apparently, the skilled person in the art can make various modifications, variations and combinations of the embodiments of the present disclosure without departing from the spirit and scope of the present disclosure. In this way, if these modifications, variations and combinations of the embodiments of the present disclosure belong to the scope defined by claims and equivalents thereof of the present disclosure and the present disclosure is also intended to contain these modifications and variations.

The above embodiments are only exemplified embodiments, instead of limiting the protection scope of the present disclosure. Therefore, the scope of the present disclosure is defined by the scope of the appended claims.

What is claimed is:

1. A display device, comprising:
   a display array layer comprising a plurality of display pixel sets, each of the plurality of display pixel sets comprising at least one display pixel; and
   a lens array layer arranged at a light exit side of the display array layer and comprising a plurality of lens groups arranged in array, each of the plurality of lens groups comprising at least one varifocal lens;
   wherein each of the plurality of lens groups is configured to vary a focal length of the at least one varifocal lens such that at least one of the plurality of display pixel sets form different viewpoints at different display phases respectively in response to variation of the focal length, and
   wherein a refresh frequency of the display array layer is not less than a refresh frequency of the lens array layer.

2. The display device according to claim 1, wherein each of the plurality of lens groups comprises one varifocal lens and each of the plurality of display pixel sets comprises at least two display pixels, the one varifocal lens corresponding to at least two display pixels of one of the plurality of display pixel sets; and wherein each of the display pixels form different viewpoints at different display phases respectively in response to variation of the focal length of a corresponding varifocal lens.

3. The display device according to claim 2, wherein each of the display pixels of the display pixel sets has a display state which varies in response to variation of the focal length of the corresponding varifocal lens.

4. The display device according to claim 2, wherein different display pixels in a same display pixel set correspond to different viewpoints respectively.

5. The display device according to claim 1, further comprising a controller, wherein the controller is configured such that at a same display phase, a plurality of the varifocal lenses have a same focal length and the focal length of each of the varifocal lenses varies as the display phase changes.

6. The display device according to claim 5, wherein the controller is further configured such that variation of the focal length of the lens is synchronous with variation of display images of the display array layer.

7. A display device, comprising:
   a display array layer comprising a plurality of display pixel sets, each of the plurality of display pixel sets comprising at least one display pixel; and
   a lens array layer arranged at a light exit side of the display array layer and comprising a plurality of lens groups arranged in array, each of the plurality of lens groups comprising at least one varifocal lens;
   wherein each of the plurality of lens groups is configured to vary a focal length of the at least one varifocal lens such that at least one of the plurality of display pixel sets form different viewpoints at different display phases respectively in response to variation of the focal length, and wherein a distance between the display array layer and the lens array layer in a direction perpendicular to the display array layer is equal to an average value of focal lengths of all of the varifocal lenses in a time domain.

8. The display device according to claim 1, wherein the plurality of lens groups are in one-to-one correspondence with the plurality of display pixel sets.

9. The display device according to claim 1, wherein all of the display pixel sets have a same number of the display pixels.

10. A display device, comprising:
a display array layer comprising a plurality of display pixel sets, each of the plurality of display pixel sets comprising at least one display pixel; and
a lens array layer arranged at a light exit side of the display array layer and comprising a plurality of lens groups arranged in array, each of the plurality of lens groups comprising at least one varifocal lens;
wherein each of the plurality of lens groups is configured to vary a focal length of the at least one varifocal lens such that at least one of the plurality of display pixel sets form different viewpoints at different display phases respectively in response to variation of the focal length, and
wherein the display array layer further comprises a plurality of spacing pixel sets, and each of the plurality of spacing pixel sets is arranged between adjacent display pixel sets and comprises at least one spacing pixel.

11. The display device according to claim 1, wherein the at least one varifocal lens comprises a liquid crystal lens or a liquid lens.

12. The display device according to claim 1, wherein the lens groups are entirely composed of varifocal lenses.

13. A method for driving the display device as claimed in claim 1, wherein each display cycle sequentially comprises a first display phase and a second display phase, the method comprising:
in the first display phase, controlling the focal lengths of the varifocal lenses in the plurality of lens groups of the lens array layer to drive the display array layer to display a first group of viewpoint images; and
in the second display phase, controlling the focal lengths of the varifocal lenses in the plurality of lens groups of the lens array layer to drive the plurality of display pixel sets in the display array layer to display a second group of viewpoint images;
wherein each of the varifocal lenses has a focal length in the first display phase that is different from that in the second display phase.

14. The method according to claim 13, wherein in the display device, each of the plurality of lens groups comprises one varifocal lens and each of the plurality of display pixel sets comprises at least two display pixels, the one varifocal lens corresponding to at least two display pixels; and wherein the method comprises:
in the first display phase, driving the display array layer to display the first group of viewpoint images and driving the lens array layer such that the focal lengths of a plurality of varifocal lenses are all equal to a first focal length; and
in the second display phase, driving the plurality of display pixel sets of the display array layer to display the second group of viewpoint images and driving the lens array layer such that the focal lengths of the plurality of varifocal lenses are all equal to a second focal length;
wherein the first focal length is unequal to the second focal length.

15. The method according to claim 13, wherein each display cycle further comprises a third display phase following the second display phase, the method further comprising:
in the third display phase, controlling the focal lengths of the varifocal lenses in the plurality of lens groups of the lens array layer and driving the plurality of display pixel sets in the display array layer to display a third group of viewpoint images;
wherein each of the varifocal lenses has a focal length in the third display phase that is different from any one of the focal length in the first display phase and the focal length in the second display phase.

16. The method according to claim 14, wherein each display cycle further comprises a third display phase following the second display phase, the method further comprising:
in the third display phase, driving the display array layer to display a third group of viewpoint images and driving the lens array layer such that the focal lengths of a plurality of lenses are all equal to a third focal length;
wherein the third focal length is neither equal to the first focal length, nor equal to the second focal length.

17. The method according to claim 14, wherein a number of viewpoint images comprised in the first group of viewpoint images and a number of viewpoint images comprised in the second group of viewpoint images are both equal to a number of the display pixels in each of the display pixel sets.

18. The method according to claim 17, wherein in the first display phase, the display pixels located at same or corresponding positions in all of the display pixel sets are driven to display image pixels corresponding to one same viewpoint image.

19. The method according to claim 17, wherein the display array layer further comprises a plurality of spacing pixel sets and each of the plurality of spacing pixel sets is arranged between adjacent display pixel sets and comprises at least one spacing pixel; and
the method further comprises:
in the first display phase and the second display phase, keeping the plurality of spacing pixel sets in the display array layer to be non-luminous.

* * * * *